US012666181B2

(12) United States Patent　　　(10) Patent No.:　US 12,666,181 B2

Frankel et al.　　　　　　　　　(45) Date of Patent:　Jun. 23, 2026

(54) RECONFIGURABLE MESH INTERCONNECT FOR HYBRID ELECTRICAL-OPTICAL CONNECTIVITY BETWEEN REGIONAL DATA CENTERS

(71) Applicant: Ciena Corporation, Hanover, MD (US)

(72) Inventors: Michael Y. Frankel, Hallandale Beach, FL (US); Vladimir Pelekhaty, Baltimore, MD (US); Spencer Giacalone, Indianapolis, IN (US); Daniel Rivaud, Ottawa (CA)

(73) Assignee: Ciena Corporation, Hanover, MD (US)

( * ) Notice: Subject to any disclaimer, the term of this patent is extended or adjusted under 35 U.S.C. 154(b) by 315 days.

(21) Appl. No.: 18/481,499

(22) Filed: Oct. 5, 2023

(65) Prior Publication Data

US 2025/0119670 A1　　Apr. 10, 2025

(51) Int. Cl.
*H04Q 11/00*　　　　(2006.01)

(52) U.S. Cl.
CPC ..... *H04Q 11/0062* (2013.01); *H04Q 11/0005* (2013.01); *H04Q 11/0001* (2013.01); *H04Q 2011/005* (2013.01); *H04Q 2011/0064* (2013.01); *H04Q 11/0066* (2013.01); *H04Q 2011/0075* (2013.01)

(58) Field of Classification Search
CPC .......... H04Q 11/0062; H04Q 11/0005; H04Q 2011/005; H04Q 2011/0075; H04Q 11/0001; H04Q 11/0066; H04Q 2011/0064; H04L 45/42; H04L 45/28; H04L 45/34; H04L 45/50; H04L 45/02

USPC ...................................................... 398/43–103
See application file for complete search history.

(56) References Cited

U.S. PATENT DOCUMENTS

| | | | |
|---|---|---|---|
| 6,243,175 | B1 | 6/2001 | Pelekhaty |
| 6,496,297 | B1 | 12/2002 | Frankel et al. |
| 6,765,659 | B1 | 7/2004 | Bhatnagar et al. |
| 6,795,607 | B1 | 9/2004 | Archambault et al. |
| 6,907,201 | B1 | 6/2005 | Frankel |
| 7,184,215 | B2 | 2/2007 | Pelekhaty |
| 7,254,327 | B1 | 8/2007 | Zhong et al. |

(Continued)

OTHER PUBLICATIONS

Jesse E. Simsarian et al., "Express Data Center Interconnection Using a Photonic Cross Connect," 2019 Optical Fiber Communication Conference and Exhibition, Mar. 3, 2019, 3 Pages.

(Continued)

*Primary Examiner* — Dibson J Sanchez

(74) *Attorney, Agent, or Firm* — Baratta Law PLLC; Lawrence A. Baratta, Jr.

(57)　　　　　ABSTRACT

An optical bypass system for interconnecting a plurality of data centers with a regional hub networking node includes an optical switching layer configured to receive a plurality of channels from each of the plurality of data centers, and to switch the plurality of channels from each of the plurality of data centers (1) between one another for optical bypass and (2) to an electrical switching fabric at the regional hub networking node; and a controller configured to (1) configure wavelengths on corresponding optical transceivers for each of the plurality of channels from each of the plurality of data centers, (2) configure wavelength switching in the optical switching layer, and (3) determine packet forwarding between the corresponding optical transceivers.

18 Claims, 9 Drawing Sheets

(56)           References Cited

U.S. PATENT DOCUMENTS

| | | | |
|---|---|---|---|
| 7,342,712 B2 | 3/2008 | Pelekhaty | |
| 7,415,208 B1 | 8/2008 | Haggans et al. | |
| 7,512,343 B2 | 3/2009 | Sridhar et al. | |
| 8,433,192 B2 | 4/2013 | Frankel et al. | |
| 8,498,542 B2 | 7/2013 | Frankel et al. | |
| 8,625,994 B2 | 1/2014 | Archambault et al. | |
| 8,699,880 B2 | 4/2014 | Grigoryan et al. | |
| 8,798,455 B2 | 8/2014 | Frankel et al. | |
| 8,942,232 B1 * | 1/2015 | Fermor | H04L 49/15 |
| | | | 370/388 |
| 8,977,125 B2 | 3/2015 | Grigoryan et al. | |
| 8,983,293 B2 | 3/2015 | Frankel et al. | |
| 9,021,130 B1 * | 4/2015 | Sahay | H04L 49/552 |
| | | | 709/239 |
| 9,191,117 B2 | 11/2015 | Alexander et al. | |
| 9,270,377 B2 | 2/2016 | Mateosky et al. | |
| 9,270,405 B2 | 2/2016 | Blair et al. | |
| 9,374,166 B2 | 6/2016 | Mateosky et al. | |
| 9,531,642 B1 | 12/2016 | Giacalone et al. | |
| 9,699,068 B1 | 7/2017 | Giacalone et al. | |
| 9,806,808 B2 | 10/2017 | Bhatnagar et al. | |
| 9,948,387 B2 | 4/2018 | Frankel et al. | |
| 10,141,926 B2 | 11/2018 | Frankel et al. | |
| 10,142,092 B2 | 11/2018 | Pelekhaty et al. | |
| 10,171,169 B2 | 1/2019 | Frankel et al. | |
| 10,194,221 B2 | 1/2019 | Frankel et al. | |
| 10,257,596 B2 | 4/2019 | Swinkels et al. | |
| 10,313,021 B1 | 6/2019 | Frankel et al. | |
| 10,348,410 B1 | 7/2019 | Charlton et al. | |
| 10,425,322 B2 | 9/2019 | Blair et al. | |
| 10,552,227 B2 * | 2/2020 | Altstaetter | G06F 9/38 |
| 10,560,765 B2 * | 2/2020 | Ryan | H04B 10/079 |
| 10,567,232 B2 | 2/2020 | Cohen et al. | |
| 10,674,241 B2 | 6/2020 | Rivaud et al. | |
| 10,924,324 B2 | 2/2021 | Rivaud et al. | |
| 11,026,001 B1 | 6/2021 | Frankel et al. | |
| 11,044,539 B1 * | 6/2021 | Marshall | H04Q 11/0066 |
| 11,196,504 B1 | 12/2021 | Frankel et al. | |
| 11,368,768 B2 * | 6/2022 | Bakopoulos | H04Q 11/0005 |
| 11,388,492 B2 | 7/2022 | Frankel et al. | |
| 11,463,176 B2 | 10/2022 | Frankel et al. | |
| 11,553,259 B2 | 1/2023 | Frankel et al. | |
| 11,563,687 B2 | 1/2023 | Pelekhaty et al. | |
| 11,711,270 B1 | 7/2023 | Pelekhaty et al. | |
| 2001/0027491 A1 * | 10/2001 | Terretta | H04L 67/1029 |
| | | | 709/238 |

| | | | |
|---|---|---|---|
| 2004/0062472 A1 | 4/2004 | Frankel et al. | |
| 2005/0094252 A1 | 5/2005 | Haggans et al. | |
| 2005/0100271 A1 | 5/2005 | Frankel et al. | |
| 2007/0166032 A1 | 7/2007 | Frankel | |
| 2009/0103931 A1 | 4/2009 | Grigoryan et al. | |
| 2009/0279900 A1 | 11/2009 | Frankel | |
| 2010/0329694 A1 | 12/2010 | Frankel | |
| 2011/0033195 A1 | 2/2011 | Frankel | |
| 2012/0008945 A1 * | 1/2012 | Singla | H04J 14/0267 |
| | | | 398/45 |
| 2015/0030327 A1 * | 1/2015 | Kataoka | G02B 26/0816 |
| | | | 398/48 |
| 2015/0043905 A1 | 2/2015 | Graves et al. | |
| 2015/0215044 A1 * | 7/2015 | Cvijetic | H04Q 11/0067 |
| | | | 398/48 |
| 2016/0034761 A1 | 2/2016 | Frankel et al. | |
| 2016/0049964 A1 | 2/2016 | Mateosky et al. | |
| 2016/0134375 A1 * | 5/2016 | Kakande | H04J 14/0307 |
| | | | 398/135 |
| 2016/0301996 A1 * | 10/2016 | Morris | H04J 14/0307 |
| 2016/0380886 A1 * | 12/2016 | Blair | H04L 45/50 |
| | | | 370/254 |
| 2017/0127157 A1 | 5/2017 | Frankel et al. | |
| 2018/0026724 A1 * | 1/2018 | Tanimura | H04B 10/616 |
| | | | 398/79 |
| 2018/0070157 A1 | 3/2018 | Menard et al. | |
| 2018/0111825 A1 | 4/2018 | Frankel et al. | |
| 2018/0123980 A1 | 5/2018 | Frankel et al. | |
| 2019/0097728 A1 | 3/2019 | Frankel et al. | |
| 2019/0149896 A1 * | 5/2019 | Grammel | H04L 41/0816 |
| | | | 398/3 |
| 2019/0182180 A1 | 6/2019 | Frankel et al. | |
| 2019/0246187 A1 * | 8/2019 | Wong | H04B 10/40 |
| 2020/0162172 A1 | 5/2020 | Sridhar et al. | |
| 2020/0236064 A1 | 7/2020 | Frankel et al. | |
| 2021/0075746 A1 | 3/2021 | Frankel | |
| 2021/0119938 A1 | 4/2021 | Pelekhaty et al. | |
| 2022/0038391 A1 | 2/2022 | Frankel et al. | |
| 2022/0075114 A1 | 3/2022 | Frankel et al. | |
| 2022/0209868 A1 | 6/2022 | Frankel et al. | |
| 2023/0232138 A1 | 7/2023 | Rivaud et al. | |
| 2023/0269185 A1 | 8/2023 | Rivaud et al. | |

OTHER PUBLICATIONS

Feb. 3, 2025, International Search Report and Written Opinion for International Patent Application No. PCT/US2024/049895.

* cited by examiner

RECONFIGURABLE MESH INTERCONNECT FOR HYBRID ELECTRICAL-OPTICAL CONNECTIVITY BETWEEN REGIONAL DATA CENTERS

FIELD OF THE DISCLOSURE

The present disclosure relates generally to networking and computing. More particularly, the present disclosure relates to systems and methods for a reconfigurable mesh interconnect for hybrid electrical-optical connectivity between regional data centers.

BACKGROUND OF THE DISCLOSURE

A data center is a physical facility hosting compute and network hardware. The data center is the physical implementation of a cloud system. In a data center operator network, there will typically be several data centers in a geographically constrained region (e.g., dozens or more datacenters). These data centers will be interconnected to one another via one or more networking nodes referred to as a regional hub networking node or some other name. Typically, a regional hub interconnects from a few data centers to as many as twenty or more data centers. It is expected such regional hub networking nodes will be interconnecting 200 Tbps (Terabits per second) of data or more from each data center. Assume, for the sake of illustration, a regional hub interconnects 16 data centers at about 200 Tbps of data, this would require 3200 Tbps of switching capacity at the regional hub. The conventional approach for such switching capacity includes a deep buffer electrical switching fabric. Further factoring in redundancy, the number of switches can be larger and will continue to grow. This approach does not scale in terms of cost, power consumption, cooling, latency, etc. Electrical switching further introduces latency, is difficult to upgrade in-service, and the like.

BRIEF SUMMARY OF THE DISCLOSURE

The present disclosure relates to systems and methods for a reconfigurable mesh interconnect for hybrid electrical-optical connectivity among regional data centers. In particular, the present disclosure includes a reconfigurable optical interconnect among regional data centers for bypassing the regional hub electrical fabric for traffic amongst the regional data centers. This can provide the following benefits:

(1) Cost and power reduction of same order as bypassed traffic, e.g., ~80%. Regional hub power can be reduced, e.g., from ~3000 kW down to ~600 kW, (2) Reduction in latency, allowing for a larger geographic regional coverage for more data centers in the region, more real-estate acquisition flexibility at lower cost, etc., (3) Reduction in space/volume, i.e., optical networking hardware generally takes less space and/or volume as electrical switching hardware, and (4) Since optical connections are rate-independent, only endpoint optical modules have to match in rate and format. Thus, gradual rate and pluggable technology upgrade is possible.

In an embodiment, an optical bypass system for interconnecting a plurality of data centers with a regional hub networking node includes an optical switching layer configured to receive a plurality of channels from each of the plurality of data centers, and to switch the plurality of channels from each of the plurality of data centers (1)

between one another for optical bypass and (2) to an electrical switching fabric at the regional hub networking node; and a controller configured to (1) configure wavelengths on corresponding optical transceivers for each of the plurality of channels from each of the plurality of data centers, (2) configure wavelength switching in the optical switching layer, and (3) determine packet forwarding between the corresponding optical transceivers.

The corresponding optical transceivers can each be a coherent optical transceiver in an electrical switch at a data center of the plurality of data centers. The optical switching layer can be located at the regional hub networking node, and the optical switching layer includes a Wavelength Selective Switch (WSS) for each of the plurality of data centers. The WSS for each of the plurality of data centers can be an N×M WSS, N and M are integers and represent ports thereon, wherein the N ports are connected to a corresponding data center of the plurality of data centers, and wherein the M ports are connected to other data centers of the plurality of data centers and the electrical switching fabric at the regional hub networking node. M can be greater than N. The optical switching layer can further include an optical circuit switch connected to the WSS for each of the plurality of data centers. The optical switching layer can further include a WSS located at each of the plurality of data centers configured to either connect to the WSS located at the regional hub networking node or a WSS located at another data center of the plurality of data centers.

The packet forwarding between the corresponding optical transceivers can be configured in an Equal Cost Multi-Path (ECMP) group. The ECMP group can include a first set of paths assigned to corresponding optical transceivers that are optically bypassed between data centers and a second set of paths assigned to corresponding optical transceivers that connect to the electrical switching fabric at the regional hub networking node. The wavelengths can be assigned to prevent blocking in the optical switching layer.

In another embodiment, a method includes steps of interconnecting a plurality of data centers with a regional hub networking node via an optical bypass system; configuring an optical switching layer in the optical bypass system, wherein the optical switching layer is configured to receive a plurality of channels from each of the plurality of data centers, and to switch the plurality of channels from each of the plurality of data centers (1) between one another for optical bypass and (2) to an electrical switching fabric at the regional hub networking node; configuring wavelengths on corresponding optical transceivers for each of the plurality of channels from each of the plurality of data centers; configuring wavelength switching in the optical switching layer; and determining packet forwarding between the corresponding optical transceivers.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a reconfigurable mesh interconnect for hybrid electrical-optical connectivity among regional data centers.

Existing Optical Switching Implementations for Data Centers

Existing optical switching implementations for data center networks generally fall into two categories—(1) optical switching inside the data center, and (2) Wide Area Network (WAN) Reconfigurable Optical Add/Drop Multiplexer (ROADM) for optical switching between data centers. As is described herein, the reconfigurable mesh interconnect for hybrid electrical-optical connectivity between regional data centers is a combination of these two techniques.

Optical Switching Inside the Data Center

Inside data center optical switching is used to reduce or eliminate layers in the electrical network. Designs have the following functional attributes:
  (1) Typically attached to lower layer network elements in the data center, such as directly to servers or to Top of Rack (TOR) switches.
  (2) Positioned as either a complete replacement for higher electrical layers or in parallel with conventional electrical switching.
  (3) Different dynamics of optical switching. Some quasi-static for handling long-lived elephant flows or long-duration jobs such as Machine Learning (ML) training. Some are more dynamic for handling gradually changing traffic patterns. Some include rapidly alternating between several predetermined configurations. Some require extremely fast nanosecond switching and correspondingly synchronized workloads. Some require dynamic detection of elephant flows for separation onto the optical switch.

WAN ROADM

WAN ROADMs are increasingly complex structures to provide high-capacity connectivity among multiple fiber directions (degrees) for telecom network connectivity. Designs have the following functional attributes:
  (1) Typically designed as stand-alone nodes to provide highest optical interconnect capacity and flexibility among attached fiber degrees.
  (2) Provides wavelength channel add/drop capability associated individually with each degree.
  (3) Full ROADM switching capability to accommodate wavelengths arriving from attached line systems.
  (4) Currently mostly quasi-static network operation, although some periodic dynamic operation is considered as for example targeting spectrum defragmentation where both end point channel wavelengths and ROADM connections are reoptimized to free up spectrum for future demands.

Internal Data Center Network

Figure 1:
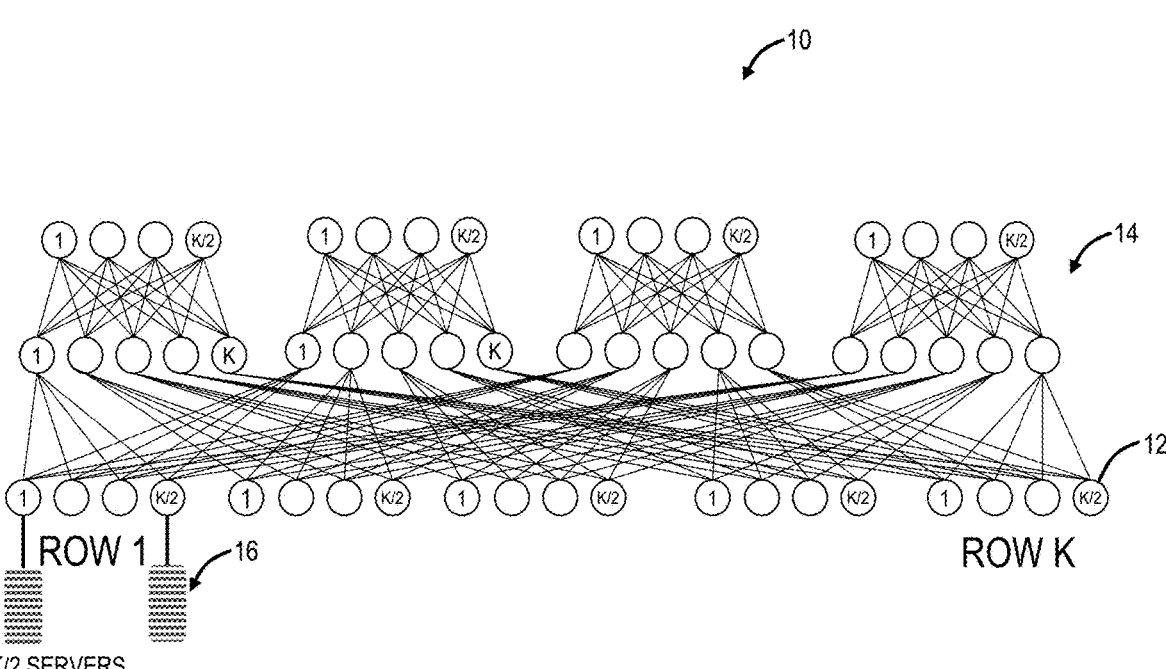
FIG. 1 is a network diagram of an example internal data center network which is an example three-layer leaf-spine folded-Clos network with various switches interconnecting servers or some other end device.

FIG. 1 is a network diagram of an example internal data center network 10 which is an example three-layer leaf-spine folded-Clos network with various switches 12, 14 interconnecting servers 16 or some other end device. The switches 14 can be referred to as spine switches (two layers in this example), and the switches 12 can be referred to as leaf switches. The spine switches 14 provide interconnect for inside data center traffic. The same spine switches 14 also host interfaces that provide interconnect to a regional hub networking node (a regional hub networking node 24 in FIGS. 2-7). The regional hub networking node 24 serves to interconnect multiple data centers 22 (in FIGS. 2-7) within a small geographic region, as well as to provide connectivity into the Wide Area Network (WAN).

Problem Statement

Figures 2, 3:
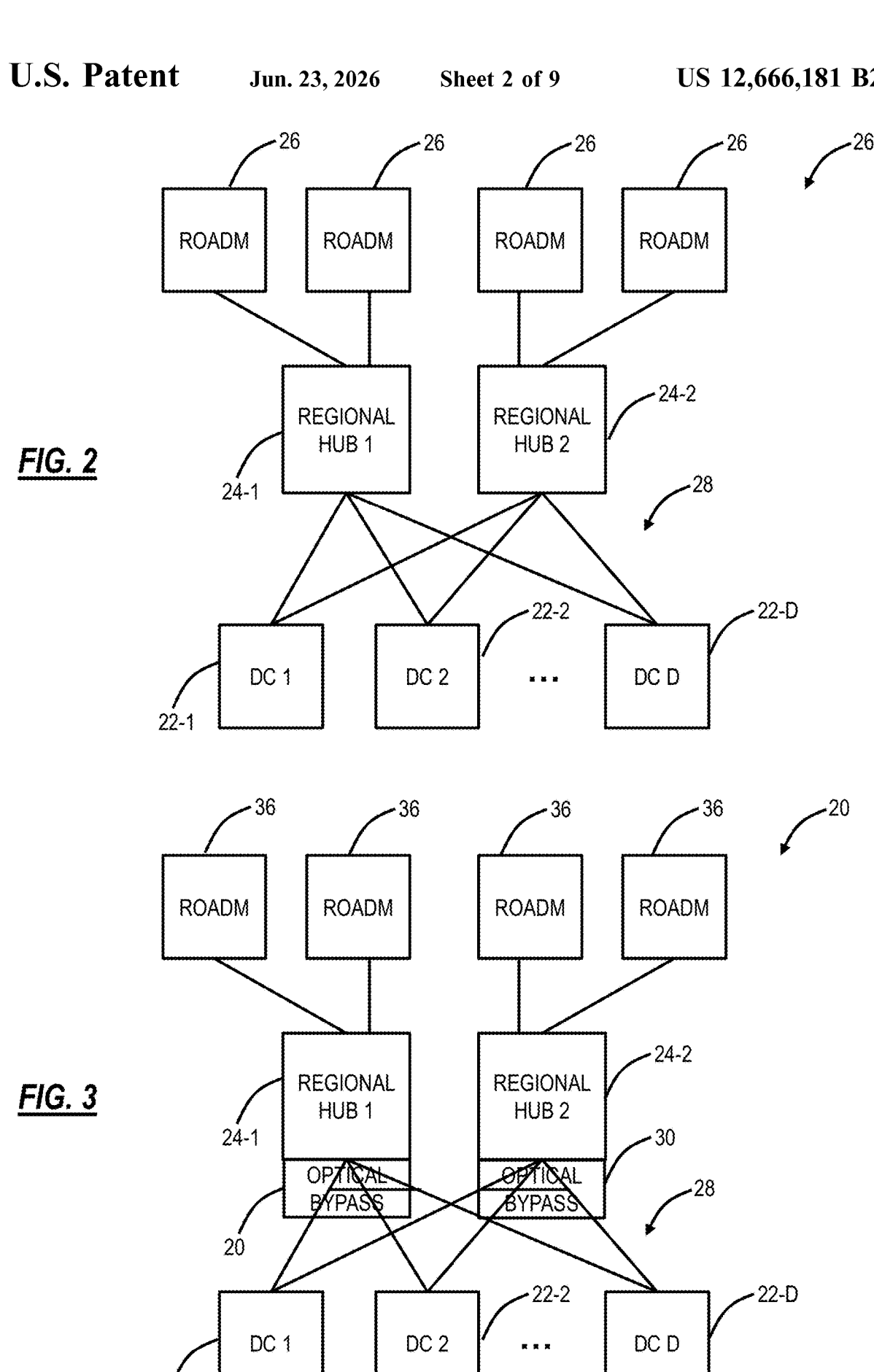
FIG. 2 is a network diagram of a network for connecting various data centers in a region to one another via one or more regional hub networking nodes.
FIG. 3 is a network diagram of the network for connecting various data centers in a region to one another via one or more regional hub networking nodes, via a reconfigurable mesh interconnect that supports optical bypass.

FIG. 2 is a network diagram of a network 20 for connecting various data centers 22 in a region to one another via one or more regional hub networking nodes 24. For illustration purposes, there can be data centers 22-1, 22-2, . . . , 22-D, where D is an integer from 2 to some larger value (e.g., 20, 25, etc.). There are two example regional hub networking nodes 24-1, 24-2, for redundancy. Of course, those skilled in the art will appreciate other values are contemplated. Connectivity 28 between each of the data centers 22-1, 22-2, . . . , 22-D and the regional hub networking nodes 24-1, 24-2 is typically 10-80 km distance, using coherent Wavelength Division Multiplexing (WDM) technology such as 400ZR pluggable optical modules directly in switches, routers, etc. The regional hub networking nodes 24 can include ROADM network elements 26 for connectivity to the WAN, and, in this example, there are two ROADMs 22 for each of the regional hub networking nodes 24-1, 24-2. Again, those skilled in the art will appreciate other values are contemplated. The ROADMs 26 provide network connectivity to other regional hub networking nodes 24 (not shown). The present disclosure focuses on the interconnect between regional data centers 22, via the regional hub networking nodes 24.

Again, a typical regional hub networking node 24 can be expected to receive 200 Tbps or more of data from the regional data centers 22, interconnecting from a few regional data centers 22 to twenty or more. For the sake of illustration and an example, assume 16 interconnected regional data centers 22, a regional hub networking node 24 would need 16*200 Tbps=3200 Tbps of switching capacity, which currently may be realized with a state-of-art electrical chassis switches (~500+ports, 200+ Tbps switching). Further, the regional hub networking nodes 24-1, 24-2 are not necessarily two different sites, but rather can be the same regional hub networking node 24, with two independent halves (for resilience). For example, the regional hub networking nodes 24-1, 24-2 can be at a same location, but include a separate set of electrical switching and separate port connectivity to the regional data centers 22. At the example with state-of-art electrical chassis switches (~500+ports, 200+ Tbps switching), this example implementation could require 64 or more chassis switches, i.e., 64 switching network elements. Further, assuming about 45 kW of power consumption for one of these state-of-art electrical switches, there is over 3000 kW of power which of course requires significant cooling. Now, there are new generations of electrical switching, but the fundamental problem remains, namely electrical switching does not scale in terms of costs, power consumption, latency, etc.

Of note, the interconnect between the regional hub networking node 24 and the regional data centers 22 is via direct, point-to-point links using ZR, ZR+, etc., namely pluggable coherent optical modems or transceivers. The present disclosure described the two existing approaches for optical switching above, namely within the data center and as a ROADM in a WAN. The interconnections between the regional hub networking node 24 and the regional data centers 22 are external, thus the solutions within the data center do not apply. Further, a ROADM is possible to optically switch between the regional data centers 22, reducing usage of the electrical switching. However, the ROADM is costly for this application. That is, optical switching fabrics have addressed WAN (ROADM) and internal data center applications, but have not addressed optical bypass interconnecting regional data centers 22 within a small geographic zone that co-optimizes simultaneously data center 22 and regional hub networking node 24 design.

Those skilled in the art will recognize that different cloud and other service providers may use different approaches to the regional hub networking node 24, and the network 20 is meant to be a generic illustration. That is, the boxes in FIG. 2 are high-level functionality at these sites, the regional hub networking node 24 and the data centers 22. In general, the regional hub networking node 24 provides both interconnect between the data centers 22 in the same region as well as acting as a gateway for connectivity to the WAN, i.e., a larger optical network (not shown) with the ROADMs 26.

Inter-Data Center Optical Switching

The proposed architecture described herein describes a regional data center network layer. This regional data center network layer is below the current WAN layer addressed by conventional WAN ROADMs and above the inside data center network. Current inside data center network optical switching approaches typically offload bulk 'elephant' flows through an optical circuit switch, and smaller 'mice' flows though electrical packet fabric. This is because interconnect bandwidth for topologically distinct links is of same order as flow sizing. In contrast, our proposed configuration provides topologically distinct interconnect bandwidth which is much higher than individual flows. Thus, interconnect links are quite stable in bandwidth load even when many flows appear/disappear. Our approach directs all traffic to direct interconnect through optical switching among data centers. As data centers grow in size and add servers or new data centers are built, additional interconnect capacity can be provisioned in a 'pay as you grow' strategy (similarly if a data center size decreases). If there is an unusual burst of unexpected traffic, that is automatically offloaded onto electrical fabric on a basis of complete flows, using an ECMP group configuration—there is no issue with packet misordering.

The present disclosure provides a reconfigurable mesh interconnect for hybrid electrical-optical connectivity between regional data centers 22. The reconfigurable mesh interconnect includes a combination of optical and electrical interconnect between the regional hub networking node 24 and the regional data centers 22, supporting electrical connectivity between the regional hub networking node 24 and the regional data centers 22, and optical connectivity between the regional data centers 22, thereby avoiding any electrical switching fabric in interconnections between the regional data centers 22. The optical connectivity between the regional data centers 22 removes persistent traffic component between the regional data centers 22 from the electrical switching fabric. The approach described herein bridges aspects of both the WAN (ROADM) and internal data center applications. A ROADM treats the optical layer independently from the packet layer, namely wavelength assignment and routing are decoupled from the endpoints. The reconfigurable mesh interconnect treats the packet and optical layers as a single layer. The reconfigurable mesh interconnect includes a combination of optical bypass, electrical connectivity, and configuration of Equal Cost Multi-Path (ECMP) routing between modems (namely between modems connecting to the electrical switching fabric in the regional hub networking node 24 and modems bypassing the regional hub networking node 14 to other regional data centers 22).

In addition to the combination of optical and electrical interconnect, the reconfigurable mesh interconnect includes a combination of hardware (network elements, network components) and software (routing techniques, control of the hardware, etc.).

Assumptions

Conventionally, all traffic between the regional hub networking node 24 and the regional data centers 22) as well as between the regional data centers 22 themselves is switched at the regional hub networking node 24 via an electrical switching fabric. For the reconfigurable mesh interconnect, it is assumed a large portion of traffic stays within the data center region, i.e., between the regional data centers 22, i.e., the regional hub networking node 24 does not send the majority of the traffic from the regional data centers 22 out via ROADMs 26. For example, there can be about 80% of the network traffic that is switched by the regional hub networking node 24 among the regional data centers 22. Now, this value can vary and what it means for the reconfigurable mesh interconnect is the split between the optical and electrical connectivity, namely the higher the value of the network traffic that remains among the regional data centers 12. the larger the number of optical bypass connections.

Another assumption is that the connectivity 28 between each of the data centers 22-1, 22-2, . . . , 22-D and the regional hub networking nodes 24-1, 24-2 includes pluggable coherent optical modems or transceivers that can be housed directly in inside data center switches, i.e., the electrical switching fabric, providing WDM channels with wavelength tunability and multi-hop reach capability. That is, the present disclosure leverages these pluggable coherent optical modems or transceivers for the optical bypass between the data centers 22-1, 22-2, . . . , 22-D.

Reconfigurable Mesh Interconnect Architecture Between Data Centers

Figure 4:
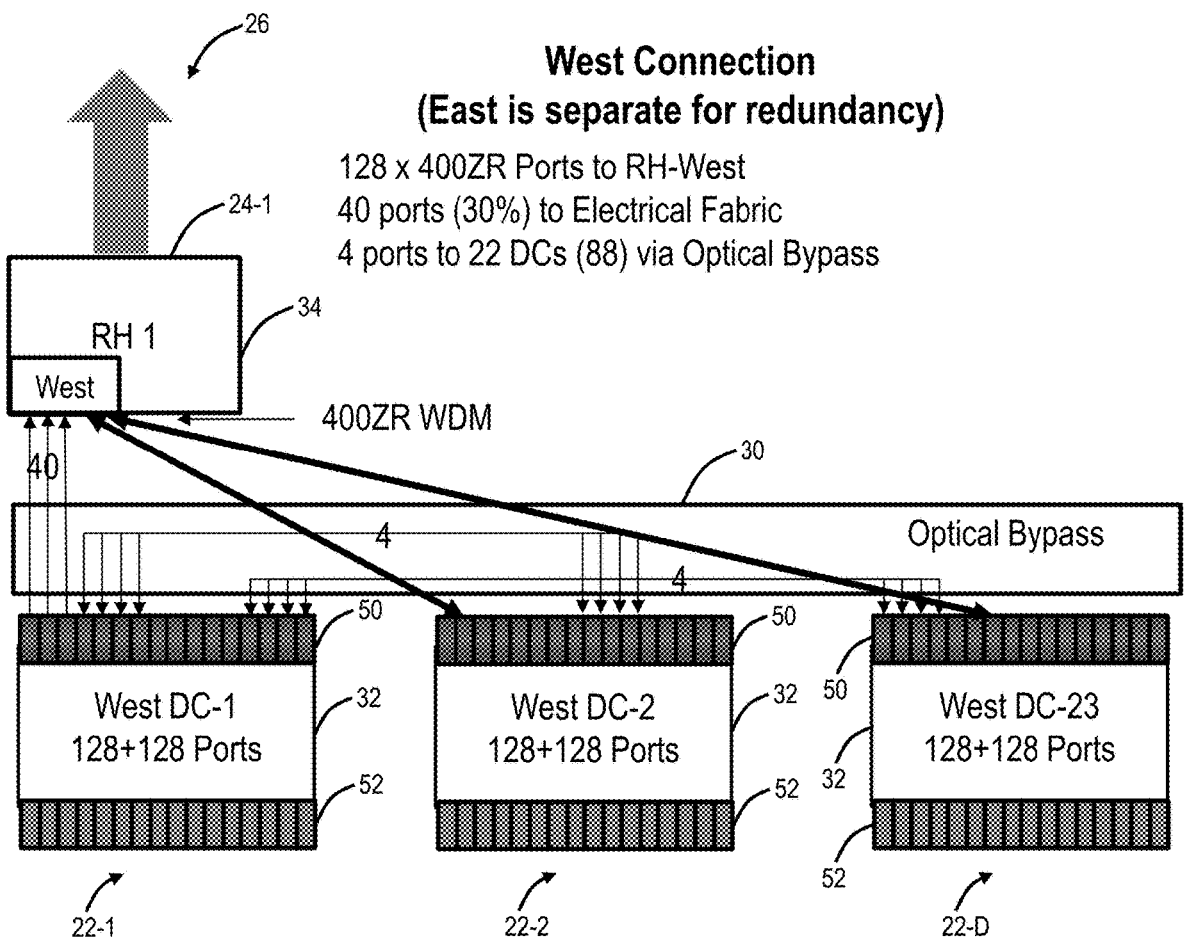
FIG. 4 is a diagram of connectivity of example electrical switches in the data centers between one another via the optical bypass and to the regional hub networking node via an electrical switch.
Figure 5:
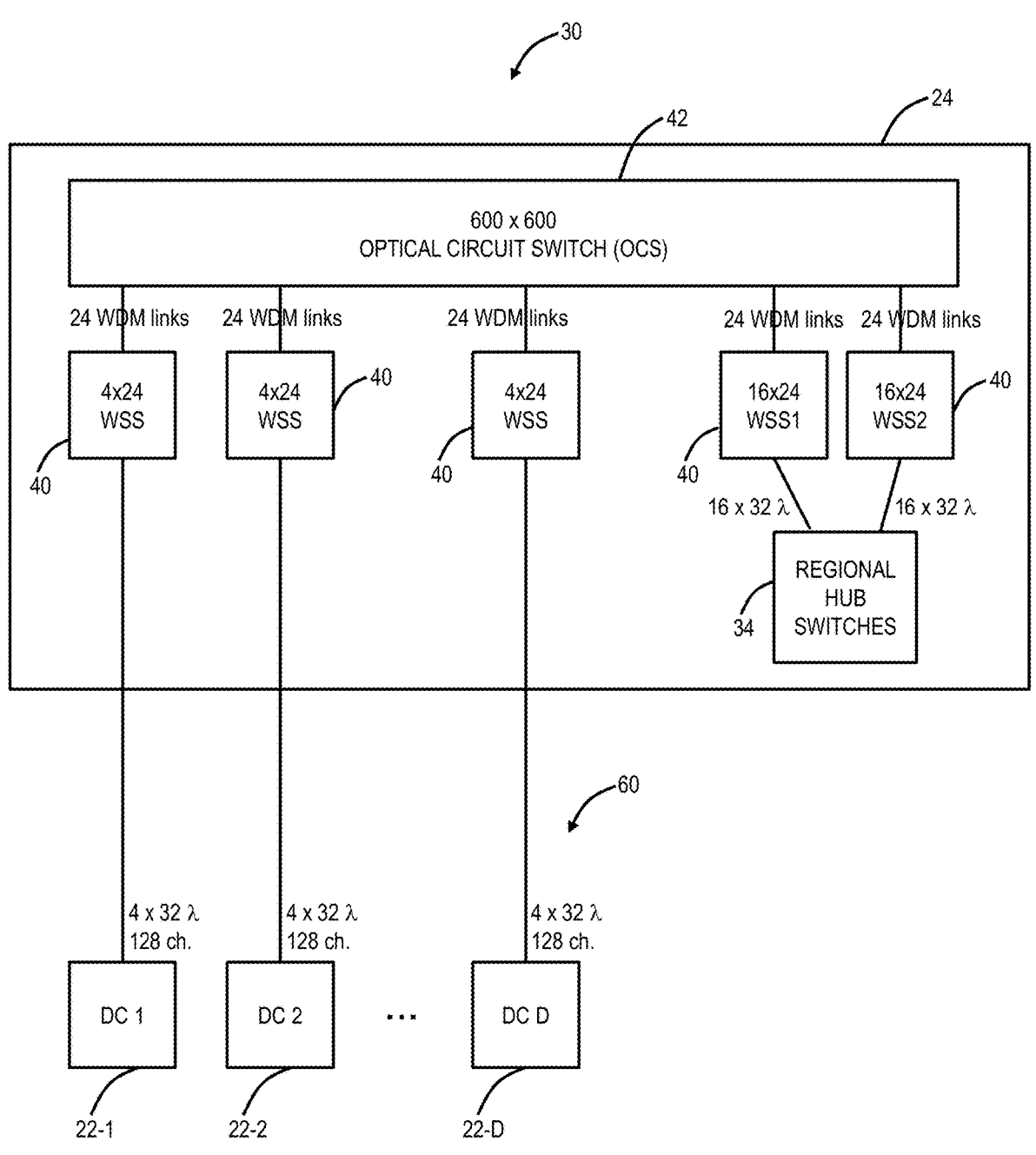
FIG. 5 is a diagram of details of the optical bypass at the regional hub networking node including a plurality of Wavelength Selective Switches (WSSs) and a large optical circuit switch.
Figure 6:
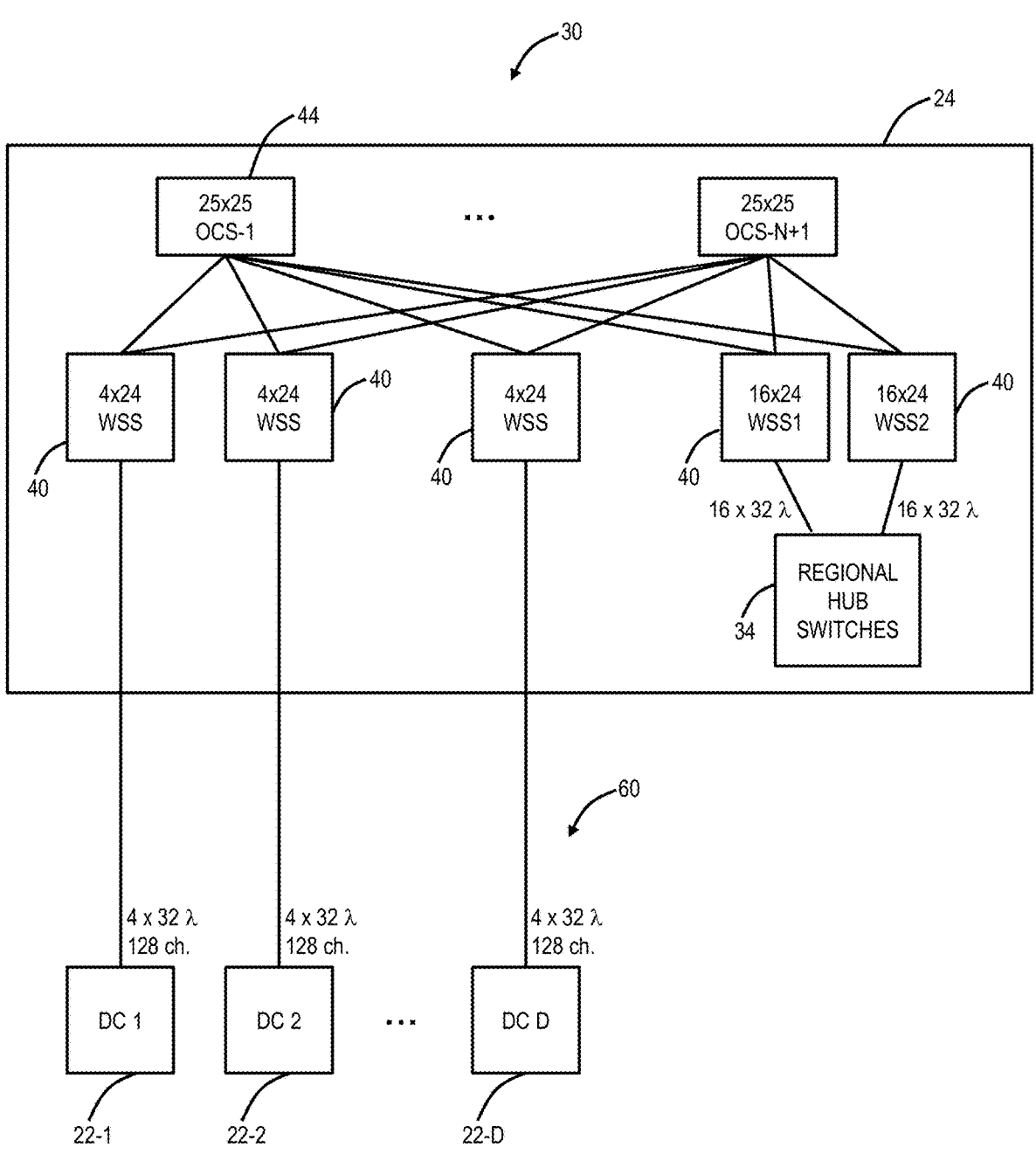
FIG. 6 is another diagram of details of the optical bypass at the regional hub networking node 14 including the plurality of WSSs and one or more smaller optical circuit switches.
Figure 7:
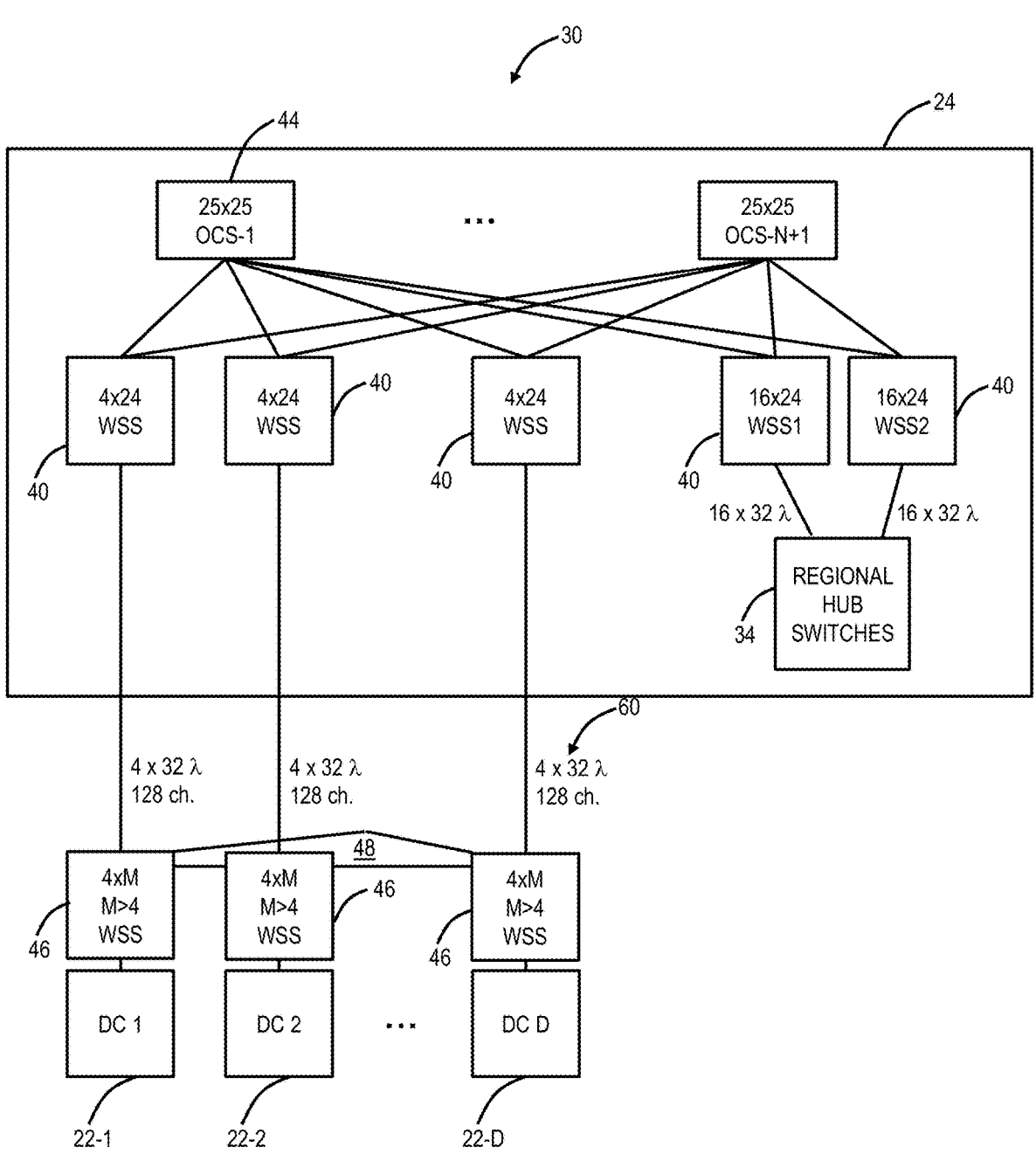
FIG. 7 is yet another diagram of details of the optical bypass at the regional hub networking node including the plurality of WSSs and one or more smaller optical circuit switches, along with WSSs at the data centers for an additional plane of optical bypass.

FIG. 3 is a network diagram of the network 20 for connecting various data centers 22 in a region to one another via one or more regional hub networking nodes 24, via a reconfigurable mesh interconnect that supports optical bypass 30. FIG. 4 is a diagram of connectivity of example electrical switches 32 in the data centers 22 between one another via the optical bypass 30 and to the regional hub networking node 24 via an electrical switch 34. FIG. 5 is a diagram of details of the optical bypass 30 at the regional hub networking node 24 including a plurality of Wavelength Selective Switches (WSSs) 30 and a large optical circuit switch 42. FIG. 6 is another diagram of details of the optical bypass 30 at the regional hub networking node 24 including the plurality of WSSs 40 and one or more smaller optical circuit switches 44. FIG. 7 is yet another diagram of details of the optical bypass 30 at the regional hub networking node 24 including the plurality of WSSs 40 and one or more smaller optical circuit switches 44, along with WSSs 46 at the data centers 22 for an additional plane of optical bypass (connections 48). We note that WSS describes a functionality of providing per wavelength selective connectivity among fiber ports and may be implemented by various physical components known in the industry.

The optical bypass 30 leverages the advanced capabilities of pluggable coherent optical modems or transceivers 50 in the electrical switches 32. These modems or transceivers 50 provide low cost and low power operation, operating in the electrical switches 32, which is ideal for data center applications. There is a need for transponders to support WDM channels. Also, these modems or transceivers 50 support longer reach include multiple spans, wavelength tunability, Forward Error Correction (FEC), and the like. These modems or transceivers 50 are used in conjunction with the optical bypass 30 which is a layer of equipment. In FIG. 3, the optical bypass 30 is illustrated functionally at the regional hub networking node 24. In FIG. 4, the optical bypass 30 is illustrated functionally in between the regional hub networking node 24 and the data centers 22, where FIG. 4 illustrates the modems or transceivers 50 and their connectivity between the optical bypass 30 and with the electrical switch 34 in the regional hub networking node 24. FIG. 5 and FIG. 6 illustrate details of the optical bypass 30 solely at the regional hub networking node 24, and FIG. 7 illustrates details of the optical bypass 30 shared between the regional hub networking node 24 and the data centers 22.

In addition to the optical bypass 30, there is an adaptation layer of functionally at the electrical switches 32 in the data centers 22. The adaptation layer includes the modems or transceivers 50 in the electrical switches 32 and configurations for packet forwarding separation into two types of paths: a) the optical bypass 30 connecting directly to adjacent data centers 22, and b) connections to the regional hub networking node 24 electrical switch 34. Of course, it is also possible to skip the regional hub networking node 24 electrical switch 34 by establishing WDM optical connections directly into the WAN network. Although this introduces substantial operational complexity by coupling several network layers.

In FIG. 4, the electrical switches 32 can include so-called gray optics 52 as well such as for connectivity to attached servers (not shown). In the example of FIG. 4, the network components are shown for half the connections, e.g., the West connections, and those skilled in the art will recognize there can be another set of equipment for redundancy. For illustration purposes, there can be 128 400ZR ports to the regional hub networking node 24 which are either terminated electrically or bypassed optically via the optical bypass 30. In this example, ~30% of the 400ZR ports (e.g., 40) are sent to the regional hub networking node 24 electrical switch 34 with 88 ports bypassed via the optical bypass 30.

Optical Bypass

FIGS. 5-7 illustrate examples of the optical bypass 30. Of course, existing optical networks have full flexibility optical bypass via ROADMs, optical control planes, and the like. The optical bypass 30 described herein is a scaled back version of these configurations, leveraging the pluggable modems or transceivers 50 directly from the electrical switches 32 along with off-the-shelf WSSs 40, 46, and packet forwarding configuration at the electrical switches 32. That is, the reconfigurable mesh interconnect is not merely porting an existing ROADM architecture between data centers, but rather it provides some aspects of the ROADM architecture along with integration of the packet and optical switching together.

For illustration purposes, FIGS. 5-7 illustrate a portion of the network 20. That is, FIGS. 5-7 illustrate a single set of electrical switches 34 in a regional hub networking node 24 and a single half of the single set of electrical switches 34 (e.g., West only). Those skilled in the art will recognize there can be two regional hub networking node 24-1, 24-2 for redundancy. Further, there can be separation of a single regional hub networking node 24 into two halves for additional redundancy (e.g., East/West). FIGS. 5-7 only show one regional hub networking node 24 with one half for ease of illustration. Of course, if additional capacity or redundancy is needed, additional parallel systems can be added and/or capacity of individual regional hub networking nodes 24 can be increased. Also, those skilled in the art will recognize any values listed in FIGS. 5-7 are presented solely for illustration purposes, and other values are contemplated consistent with the techniques described herein.

FIGS. 5-7 are described together now and their differences are addressed later. The data centers 22-1, 22-2, 22-D are assumed to be present in a region. The data centers 22-1, 22-2, 22-D are shown as single boxes and may have different sizes and number of servers. For the optical bypass 30 in FIGS. 5-7, one can view the data centers 22-1, 22-2, 22-D as black boxes having a plurality of output channels 60 (e.g., 128 channels, over four fiber pairs—4>32λ). Of course, other implementations are contemplated. In this example, the data centers 22-1, 22-2, 22-D provide 4 parallel Optical Line Systems (OLS), each providing 32 working WDM channels 60. Each channel can be a 400ZR+ type transceiver (XCVR) with TX/RX wavelength tunability, with a total illustrated capacity of 51.2 Tbps. (Higher channel counts and higher XCVR data rates such as 800ZR+ or 1600ZR+, etc. are contemplated). Smaller or initial deployments data centers may use fewer than 4 OLSs, for example only 1 or 2 OLS may be sufficient. Thus, OLSs may be deployed incrementally as data center size grows.

The channels 60 interconnect the data centers 22 with the regional hub networking node 24. In the conventional approach, these channels 60 connect to corresponding modems or transceivers 50 on the electrical switches 34. In the present disclosure, the channels 60 connect to multi-port WSSs 40, e.g., with a commercially available 4×24 modules being illustrated; of course, other values are contemplated. In this example, the WSS 40 has 4 ports connected to the corresponding data center 22 and 24 ports connected to one another directly or via the optical circuit switch 42. The bottom WSS port count (4 in this example) defines data center interconnect bandwidth and may be expected to be densely filled. The top WSS port count (24 in this example) defines how many distinct destinations can be simultaneously connected to a particular data center. In this illustration, we allocate two connections per data center 22 to the regional hub networking node 24 electrical switches 34, thereby providing an ability to direct ~50% of traffic to the electrical switches 34, if needed. We also provide at least 1 direct optical bypass connection among all data centers 22-1, 22-2, 22-D, allowing for up to 23 DCs in the region (24 WSS ports—2 ports for the electrical switches 34).

The WSS 40 provides a redistribution function of OLS wavelengths among data center 22-1, 22-2, 22-D connections. Thus, even though there may be only 1 physical path between each pair of data centers 22-1, 22-2, 22-D, the bandwidth is variable by wavelength allocation between zero and 32 wavelengths, in this example.

Although hard-wired pair-wise connections can be established between the WSSs 40, the optical circuit switch 42 may be provided for additional flexibility. For example, if some pairs of data centers 22-1, 22-2, 22-D need long duration bandwidth exceeding a single 32λ allocation, additional physical path connections can be provided.

We should note that wavelength connections directed to the electrical switches 34 can also be directly optically connected to the WAN ports towards external networks. While interesting from an architectural perspective, this configuration may be operationally difficult. Data center switches would now have to be aware of WAN topology and maintain corresponding routing tables.

In FIG. 5, the optical circuit switch 42 is a single large device, e.g., a 600×600 port switch. In FIGS. 6 and 7, the optical circuit switch can be a smaller optical circuit switch 44, implemented as several smaller, cheaper blocks which can provide additional failure redundancy and again can be deployed gradually for cost mitigation. As the number of data centers 22-1, 22-2, 22-D and/or data center 22-1, 22-2, 22-D size starts small, we deploy a few optical circuit switches 44 to account for inter-data center traffic as well data center-regional hub networking node traffic. Additional optical circuit switches 44 can be deployed as data center count and/or bandwidth increases.

In FIG. 7, there are WSSs 46 deployed as well at the data centers 22, forming a second layer of optical switching between the data centers 22 and the regional hub networking node 24. This approach can enable direct optical connectivity between the data centers 22 without having to go to the regional hub networking node 24, such as where there is direct fiber connectivity between any two data centers 22-1, 22-2, 22-D. With this approach, the regional hub networking node 24 can actually depopulate its own connections between two data centers 22-1, 22-2, 22-D with the WSSs 46, i.e., it shifts to a different plane of the architecture.

Wavelength Control and Packet Forwarding Configuration

In addition to the optical bypass 30 and associated WSSs 40, 46 and the optical circuit switches 42, 44, there is a need for control functionality. The control functionality can be implemented as a method with steps, via circuitry and/or processors configured to implement the steps, and as a non-transitory computer-readable medium storing instructions for programming the circuitry and/or processors to implement the steps. That is, the control functionality can be software on or associated with the electrical switches 32, on or associated with the WSSs 40, 46 and the optical circuit switches 42, 44. The control functionality includes: (1) Collecting interconnect bandwidth requirements, (2) Wavelength assignment, (3) WSS 40, 46 and optical circuit switch 42, 44 configuration and wavelength mapping, and (4) ECMP group assignments. Note that ECMP is associated with a packet Layer 3 set of protocols, and the present disclosure contemplates other approaches for managing connection bandwidth such Layer 2 Link Aggregation Group (LAG) or Flexible Ethernet (FlexE) or the like.

(2) Wavelength assignment includes assignment of specific wavelengths λ to the modems or transceivers 50 constrained by a requirement to avoid wavelength collisions (no two channels can have the same wavelength on a same link through the optical bypass 30), minimize unnecessary reconfiguration of existing wavelengths (prefer to set and forget rather than to continually retune the modems or transceivers 50), etc. With the values and configurations described herein, the following constraints exist:

(a) We can have 32 (maybe up to 48 or more) distinct working channels on each optical circuit switch, but have 55 available wavelength slots, e.g., with free ones being used to mitigate λ collisions.

(b) Similarly, each one of the 24 WSS ports can only have one instance of each available 55 wavelength slots occupied.

(c) Wavelengths must be continuous between each pair of data centers 22-1, 22-2, 22-D or data center 22-1, 22-2, 22-D to regional hub networking node 24 physical connections.

Figure 8:
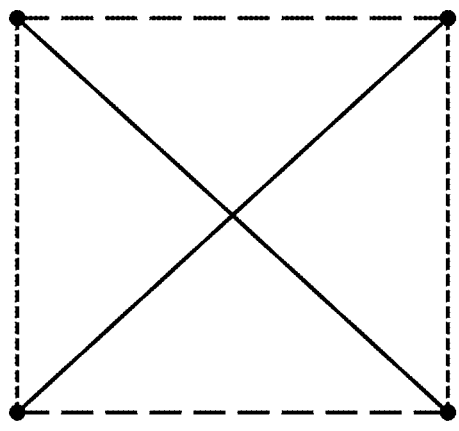
FIG. 8 is a diagram of graphs with vertices corresponding to data centers and edges corresponding to wavelength assignment.
Figure 8:
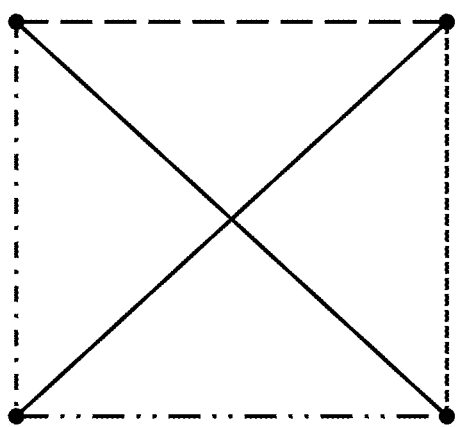
Figure 8:
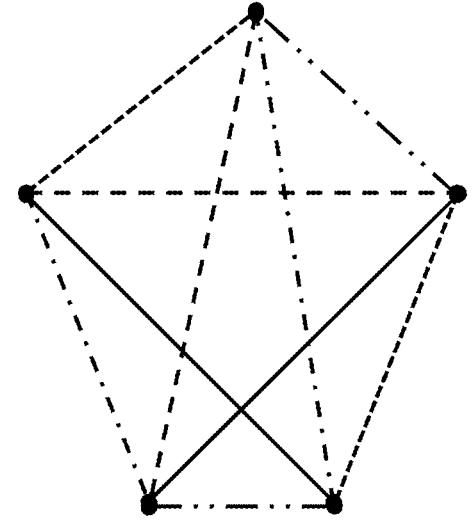

Configuring modem or transceiver 50 wavelengths and channel assignments, WSS remappings and optical circuit switch connectivity can be implemented using graph 'coloring' algorithms, where each vertex is limited to supporting only unique, non-repeating 'colors.' Thus, 'colors' can be conserved while properly interconnecting all required pairs. FIG. 8 is a diagram of graphs with vertices corresponding to data centers and edges corresponding to wavelength assignment. This is a small example of a wavelength assignment algorithm showing how optical connections are assigned to distinct wavelengths to support connection upgradability from 4 to 5 data centers.

For example, the distribution from data centers 22-1, 22-2, 22-D: 4×24 WSS separates wavelengths into 24 fibers with fixed destinations (other data centers 22-1, 22-2, 22-D or the regional hub networking node 24). The collection into data center 22-1, 22-2, 22-D: 4×24 WSS aggregates incoming wavelengths into 4 line systems. No more than 4 of same wavelength is allowed to be directed to a single data center 22-1, 22-2, 22-D (since 4 OLSs). However, this is easy to avoid as there are 55 wavelength slots available and only 32 occupied. For example, a data center 22 can source a total of 4*23*32=2944 wavelengths. The regional hub networking node 24 can accept a total of 32*32=1024 wavelengths (or 32*55=1760 if all wavelengths are allowed), i.e. 30% to 50% of total capacity can be directed to the electrical switches 34.

(3) WSS 40, 46 and optical circuit switch 42, 44 configuration and wavelength mapping includes configuring the optical circuit switch 42, 44 to support required pairwise bandwidth. This also includes WSS wavelength remapping between the 4 OLS ports and the 24 OCS ports, such that correct wavelength pairwise connections are established.

Packet Forwarding Configuration

Figure 9:
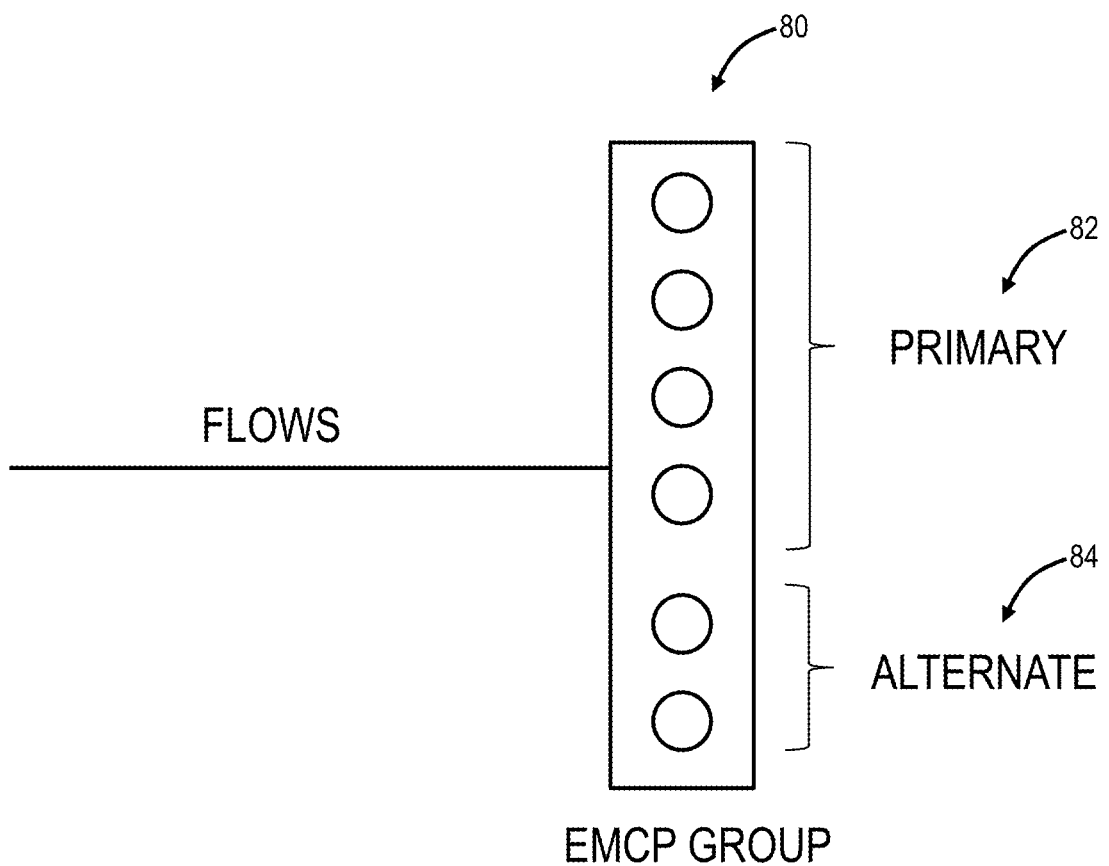
FIG. 9 is a diagram of dynamic load balancing approach across dual Equal Cost Multi-Path (ECMP) paths.

Referring to FIG. 4, the electrical switches 32 have transceivers 50 connected to the electrical switch 34 in the regional hub networking node 24 and other transceivers 50 connected to corresponding electrical switches 32 in other data centers 22, via the optical bypass 30. There can be situations where traffic is overwhelmed on either set of connections, e.g., such as a need to send more traffic via the optical bypass 30 than it can support. To address this, the present disclosure includes a dynamic load balancing approach across dual ECMP paths, namely a primary and alternate path. FIG. 9 is a diagram of dynamic load balancing approach across dual ECMP paths.

The dynamic load balancing approach can be configured on flows between the data centers 22-1, 22-2, 22-D via the optical bypass. Data center to regional hub networking node connections are assigned to a single ECMP group 80 associated with corresponding DC-DC connection. As is known in the art, Equal-cost multipath (ECMP) is a network routing strategy that allows for traffic of the same source and destination—to be transmitted across multiple paths of equal cost, while individual flows are restricted to a single physical path to prevent packet reordering. The single ECMP group 80 allows for the multiple paths to be distinguished between optical paths via the optical bypass (primary paths 82) and electrical switch paths (alternate paths 84). This provides separation of DC-DC pairwise ECMP port groups (assigned to specific modems or transceivers 50) such that ECMP-Primary uses optical bypass paths, while ECMP-Alternate is assigned to terminate on the electrical switch 34 in the regional hub networking node 24. This allows DC-DC traffic in excess of optical bypass paths to make use of the regional hub networking node 24 electrical layer and be correctly delivered, albeit with higher expense and latency. This ECMP port group contemplates operation via switching circuitry (e.g., switch ASICs). Note, while we show the optical bypass on the primary paths 82 and the electrical switch paths on the alternate paths 84, the opposite approach is also contemplated. As such, we can refer to the optical bypass on a first set of paths and the electrical switch paths on a second set of paths.

This approach can be referred to as unequal path ECMP. The implementation understands, and can react to, large flows, and offload those without any packet loss. This can be done with buffering, rapid reconfiguration, a combination of both, or some other mechanism. The network interfaces are configured with some mechanism that allows different interfaces to be directly connected and addressed properly (e.g., via the same subnet). This approach would limit interface churn (new direct connection establishment rate and connection quantity) such as not to cause problems with routing protocols. Also, sufficient flows can be moved to the optical bypass such that the remaining capacity can handle "ambient" traffic with zero loss or the optical bypass can be used in addition to existing capacity and use to curb future capacity scaling of existing/non bypass capacity.

Again, ECMP is one approach and other approaches are also contemplated, such as LAG, FlexE, etc.

Wavelength and Switching Interoperability

This approach enables a pool of transceiver and switch port resources for the data centers 22. The transceiver ports form a continuous resource pool inside each data center 22. A transceiver port can be flexibly directed to any other data center 22 or to the electrical switch 34 in the regional data center hub 24. This allows for a very efficient leveraging of statistics of large numbers. Bandwidth utilization is maximized with minimal inaccessible waste. New capacity can be easily added without regard to where it might eventually be most helpful.

This approach also enables a pool of transceiver and switch port resources for the regional data center hub 24. A transceiver port can be flexibly directed to any data center 22-1, 22-2, 22-D. This allows for a very efficient leveraging of statistics of large numbers. Bandwidth utilization is maximized with minimal inaccessible waste as it is flexibly reallocated among data centers. New capacity can be easily added without regard where it might eventually be most helpful.

There is a strong operational coupling between the data center spine layer that houses WDM pluggable transceivers and the optical switching layer (the optical bypass 30) in the regional hub networking node 24. Three things need to be computed and configured for each inter-data center connection, assuming Layer 3 Internet Protocol (IP) protocols:

(1) ECMP group association with WDM ports on data center spine switches: Data center traffic is split into 2 ECMP groups with corresponding assignment to physical ports (Pluggable): (a) primary ECMP which is assigned to optically bypassed transceivers 50, and secondary ECMP that is assigned to 'just in case traffic going to the electrical switch 34 in the regional hub networking node 24.

(2) Pluggable wavelength assignment computations that consider wavelength blocking issues on WDM line systems and on internal optical switch fabric ports.

(3) Configuration of WSS and the optical circuit switch in the optical bypass layer.

There is reservation of empty wavelength slots on optical line system (OLS) to accommodate reduced 'reconfigurable nonblocking' collisions, i.e., minimize probability of disturbing existing traffic connections. For example, 32 'active' channels on a 55 channel OLS.

There is upgradeability in data rate and technology as the optical bypass 30 is independent of optical format and wavelength. Only a small fraction of electrical end points inside the data centers 22 and regional hub networking node 24 need to be upgraded at a time to provide end-point matched connections.

This leads to a considerable simplification of the optical bypass fabric, which minimizes its cost, complexity and allows it to scale to very large degree counts (multiple 10's to over 100).

Intrinsic parallel redundancy inherent in data centers allows parallel implementations for several optical bypass fabrics (Regional East, Regional West, etc.). Again, traffic is ECMP'd over parallel paths.

Advantages

This reconfigurable optical interconnect among regional data centers 22 to bypass regional hub networking node 24 electrical switch 34 can provide the following benefits:

(1) Cost and power reduction on the same order as a percentage bypassed traffic, i.e., ~80%. Regional hub power can be reduced from ~3000 kW down to ~600 kW, when ~80% of the ports are bypassed. Also, there is a reduction in space/volume, again due to the fact optical hardware is smaller volume than electrical switching hardware.

(2) Reduction in latency, allowing for a larger geographic regional coverage a more data centers in the region, more real-estate acquisition flexibility at lower cost, etc.

(3) Since optical connections are rate-independent, only end-point modems or transceivers 50 must match in rate and format. Thus, gradual rate and pluggable technology upgrade is possible.

(4) Leverages the investment and development of 400ZR+ (and above) coherent plugs.

(5) Leverages technology and supply chain in Wavelength Selective Switch (WSS) and Optical Circuit Switch (OCS) modules, without the costs of deploying full ROADMs in the data center interconnect network.

(6) Provides operational synergy with data center switches, which can provide needed packet-level telemetry for optical layer control.

Process

Figure 10:
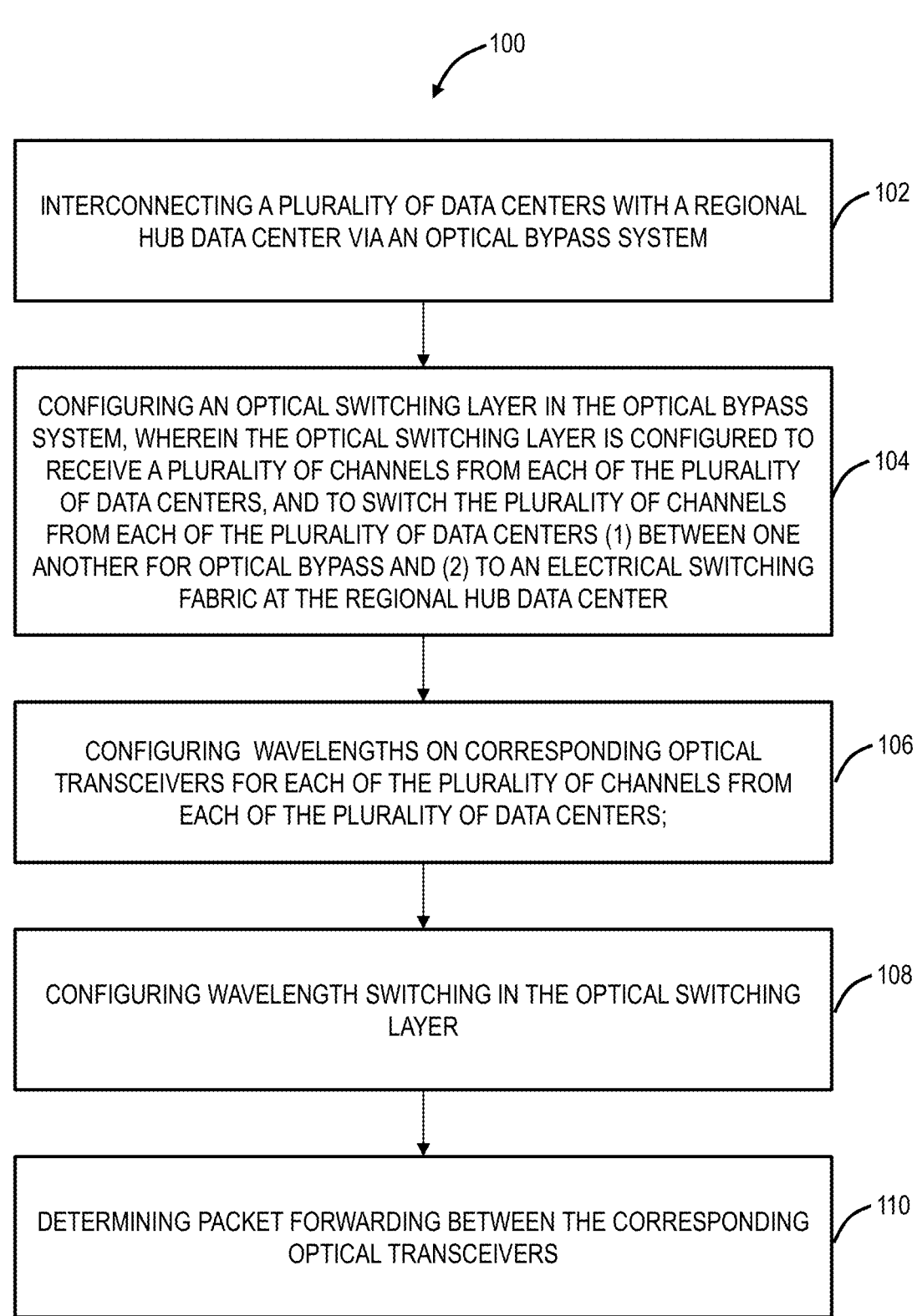
FIG. 10 is a flowchart of a process for implementing the reconfigurable optical interconnect among regional data centers to bypass electrical fabric at the regional hub networking node.

FIG. 10 is a flowchart of a process 100 for implementing the reconfigurable optical interconnect among regional data centers 22 to bypass regional hub networking node 24. The process 100 includes interconnecting a plurality of data centers with a regional hub networking node via an optical bypass system (step 102); configuring an optical switching layer in the optical bypass system, wherein the optical switching layer is configured to receive a plurality of channels from each of the plurality of data centers, and to switch the plurality of channels from each of the plurality of data centers (1) between one another for optical bypass and (2) to an electrical switching fabric at the regional hub networking node (step 104); configuring wavelengths on corresponding optical transceivers for each of the plurality of channels from each of the plurality of data centers (step 106); configuring wavelength switching in the optical switching layer (step 108); and determining packet forwarding between the corresponding optical transceivers (step 110).

The corresponding optical transceivers can each be a pluggable coherent optical transceiver in an electrical switch at a data center of the plurality of data centers. The optical switching layer can be located at the regional hub networking node, and the optical switching layer includes a Wavelength Selective Switch (WSS) for each of the plurality of data centers.

The WSS for each of the plurality of data centers can be an N×M WSS, N and M are integers and represent ports thereon, wherein the N ports are connected to a corresponding data center of the plurality of data centers, and wherein the M ports are connected to other data centers of the plurality of data centers and the electrical switching fabric at the regional hub networking node. The optical switching layer can further include an optical circuit switch connected to the WSS for each of the plurality of data centers. In an embodiment, M can be greater than N. The optical switching layer can further include a WSS located at each of the plurality of data centers configured to either connect to the WSS located at the regional hub networking node or a WSS located at another data center of the plurality of data centers.

The packet forwarding between the corresponding optical transceivers can be configured in an Equal Cost Multi-Path (ECMP) group. The ECMP group can include a set of primary paths assigned to corresponding optical transceivers that are optically bypassed between data centers and a set of alternate paths assigned to corresponding optical transceivers that connect to the electrical switching fabric at the regional hub networking node. The wavelengths can be assigned to prevent blocking in the optical switching layer.

In another embodiment, an optical bypass system for interconnecting a plurality of data centers with a regional hub networking node includes an optical switching layer configured to receive a plurality of channels from each of the plurality of data centers, and to switch the plurality of channels from each of the plurality of data centers (1) between one another for optical bypass and (2) to an electrical switching fabric at the regional hub networking node; and a controller configured to (1) configure wavelengths on corresponding optical transceivers for each of the plurality of channels from each of the plurality of data centers, (2) configure wavelength switching in the optical switching layer, and (3) determine packet forwarding between the corresponding optical transceivers.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An optical bypass system for interconnecting a plurality of data centers with a regional hub networking node, the optical bypass system comprising:

an optical switching layer configured to receive a plurality of channels from each of the plurality of data centers, and to switch the plurality of channels from each of the plurality of data centers (1) between one another for optical bypass and (2) to an electrical switching fabric at the regional hub networking node; and a controller configured to (1) configure wavelengths on corresponding optical transceivers for each of the plurality of channels from each of the plurality of data centers, wherein the corresponding optical transceivers comprise pluggable coherent optical transceivers housed in electrical switches at the plurality of data centers, (2) configure wavelength switching in the optical switching layer, and (3) determine packet forwarding between the corresponding optical transceivers, wherein configuring the wavelengths includes computing a wavelength assignment that avoids wavelength collisions through the optical switching layer and assigns wavelengths to prevent blocking on links between the plurality of data centers and on ports of the optical switching layer, and wherein the packet forwarding between the corresponding optical transceivers is configured in an Equal Cost Multi-Path (ECMP) group, and wherein the controller configures the ECMP group to distribute inter-data-center traffic on a per-flow basis across multiple equal-cost paths including at least one optically bypassed path and at least one path through the electrical switching fabric at the regional hub networking node, such that individual flows are restricted to a single selected path to prevent packet reordering.

2. The optical bypass system of claim 1, wherein the corresponding optical transceivers are each a coherent optical transceiver in an electrical switch at a data center of the plurality of data centers.

3. The optical bypass system of claim 1, wherein the optical switching layer is located at the regional hub networking node, and the optical switching layer includes a Wavelength Selective Switch (WSS) for each of the plurality of data centers.

4. The optical bypass system of claim 3, wherein the WSS for each of the plurality of data centers is an N×M WSS, N and M are integers and represent ports thereon, wherein the N ports are connected to a corresponding data center of the plurality of data centers, and wherein the M ports are connected to other data centers of the plurality of data centers and the electrical switching fabric at the regional hub networking node.

5. The optical bypass system of claim 4, wherein M is greater than N.

6. The optical bypass system of claim 3, wherein the optical switching layer further includes an optical circuit switch connected to the WSS for each of the plurality of data centers.

7. The optical bypass system of claim 3, wherein the optical switching layer further includes a WSS located at each of the plurality of data centers configured to either connect to the WSS located at the regional hub networking node or a WSS located at another data center of the plurality of data centers.

8. The optical bypass system of claim 1, wherein the ECMP group includes a first set of paths assigned to corresponding optical transceivers that are optically bypassed between data centers and a second set of paths assigned to corresponding optical transceivers that connect to the electrical switching fabric at the regional hub networking node.

9. The optical bypass system of claim 1, wherein the wavelengths are assigned to prevent blocking in the optical switching layer.

10. A method comprising steps of:

interconnecting a plurality of data centers with a regional hub networking node via an optical bypass system;

configuring an optical switching layer in the optical bypass system, wherein the optical switching layer is configured to receive a plurality of channels from each of the plurality of data centers, and to switch the plurality of channels from each of the plurality of data centers (1) between one another for optical bypass and (2) to an electrical switching fabric at the regional hub networking node;

configuring wavelengths on corresponding optical transceivers for each of the plurality of channels from each of the plurality of data centers, wherein the corresponding optical transceivers comprise pluggable coherent optical transceivers housed in electrical switches at the plurality of data centers;

configuring wavelength switching in the optical switching layer; and determining packet forwarding between the corresponding optical transceivers, wherein configuring the wavelengths includes computing a wavelength assignment that avoids wavelength collisions through the optical switching layer and assigns wavelengths to prevent blocking on links between the plurality of data centers and on ports of the optical switching layer, and wherein the packet forwarding between the corresponding optical transceivers is configured in an Equal Cost Multi-Path (ECMP) group, and wherein the controller configures the ECMP group to distribute inter-data-center traffic on a per-flow basis across multiple equal-cost paths including at least one optically bypassed path and at least one path through the electrical switching fabric at the regional hub networking node, such that individual flows are restricted to a single selected path to prevent packet reordering.

11. The method of claim 10, wherein the corresponding optical transceivers are each a pluggable coherent optical transceiver in an electrical switch at a data center of the plurality of data centers.

12. The method of claim 10, wherein the optical switching layer is located at the regional hub networking node, and the optical switching layer includes a Wavelength Selective Switch (WSS) for each of the plurality of data centers.

13. The method of claim 12, wherein the WSS for each of the plurality of data centers is an N×M WSS, N and M are integers and represent ports thereon, wherein the N ports are connected to a corresponding data center of the plurality of data centers, and wherein the M ports are connected to other data centers of the plurality of data centers and the electrical switching fabric at the regional hub networking node.

14. The method of claim 13, wherein the optical switching layer further includes an optical circuit switch connected to the WSS for each of the plurality of data centers.

15. The method of claim 13, wherein M is greater than N.

16. The method of claim 12, wherein the optical switching layer further includes a WSS located at each of the plurality of data centers configured to either connect to the WSS located at the regional hub networking node or a WSS located at another data center of the plurality of data centers.

17. The method of claim 10, wherein the ECMP group includes a first set of paths assigned to corresponding optical transceivers that are optically bypassed between data centers and a second set of paths assigned to corresponding optical transceivers that connect to the electrical switching fabric at the regional hub networking node.

18. The method of claim 10, wherein the wavelengths are assigned to prevent blocking in the optical switching layer.

\*   \*   \*   \*   \*